(12) United States Patent
Snegg

(10) Patent No.: US 8,770,766 B2
(45) Date of Patent: Jul. 8, 2014

(54) BLIND SPOT MIRROR

(76) Inventor: Harry Snegg, Long Beach, CA (US)

( * ) Notice: Subject to any disclaimer, the term of this patent is extended or adjusted under 35 U.S.C. 154(b) by 242 days.

(21) Appl. No.: 13/183,730

(22) Filed: Jul. 15, 2011

(65) Prior Publication Data

US 2012/0014008 A1   Jan. 19, 2012

Related U.S. Application Data

(60) Provisional application No. 61/365,039, filed on Jul. 16, 2010.

(51) Int. Cl.
*G02B 5/08* (2006.01)
*G02B 7/182* (2006.01)

(52) U.S. Cl.
USPC .......................................... 359/844; 359/871

(58) Field of Classification Search
USPC ....................................................... 359/844
See application file for complete search history.

(56) References Cited

U.S. PATENT DOCUMENTS

| | | | |
|---|---|---|---|
| 2,455,919 A | 12/1948 | Daon | |
| 2,857,810 A | 10/1958 | Troendle | |
| 3,131,250 A | 4/1964 | Ely | |
| 3,316,052 A | 4/1967 | Ross | |
| 3,734,447 A | 5/1973 | Perison, Sr. | |
| 4,200,359 A | 4/1980 | Lawson | |
| 4,293,191 A | 10/1981 | Kim | |
| 4,526,446 A * | 7/1985 | Adams | 359/864 |
| 4,696,555 A | 9/1987 | Enomoto | |
| 4,832,476 A | 5/1989 | Gabrielyan | |
| 4,863,254 A | 9/1989 | Dyer | |
| 4,877,214 A | 10/1989 | Toshiaki et al. | |
| 5,165,081 A | 11/1992 | Drumheller | |
| 5,178,448 A | 1/1993 | Adams et al. | |
| 5,604,644 A | 2/1997 | Lang et al. | |
| 5,671,996 A | 9/1997 | Bos et al. | |
| 5,760,980 A | 6/1998 | Lang | |
| 6,022,113 A | 2/2000 | Stolpe et al. | |
| 6,282,771 B2 | 9/2001 | Englander | |
| 6,328,451 B1 | 12/2001 | Lang | |
| 6,352,348 B1 | 3/2002 | Lang et al. | |
| 2002/0027727 A1 | 3/2002 | Lang et al. | |
| 2003/0007265 A1 | 1/2003 | Norman | |

FOREIGN PATENT DOCUMENTS

GB          2252946          8/1992

* cited by examiner

*Primary Examiner* — Jade R Chwasz
(74) *Attorney, Agent, or Firm* — JP Webb; Jason P. Webb; Danny Y. H. Cheng

(57) ABSTRACT

A blind spot mirror configured to attach to a face of a side mounted automobile mirror to provide an enhanced view. The blind spot mirror includes a mirror and a mirror housing. The mirror housing includes a plurality of rectangular-column support posts and a plurality of protrusions configured to support the mirror. The blind spot mirror includes a base coupled to a rear surface of the mirror housing. The base includes a flat rear surface configured to couple to a face of a side mounted automobile mirror. The blind spot mirror includes a ball and socket coupling member coupled to the base and the mirror housing. The ball and socket coupling member is configured to functionally pivot the mirror housing about the side mounted automobile mirror. The ball and socket coupling member is disposed substantially off-center on the mirror housing.

16 Claims, 9 Drawing Sheets

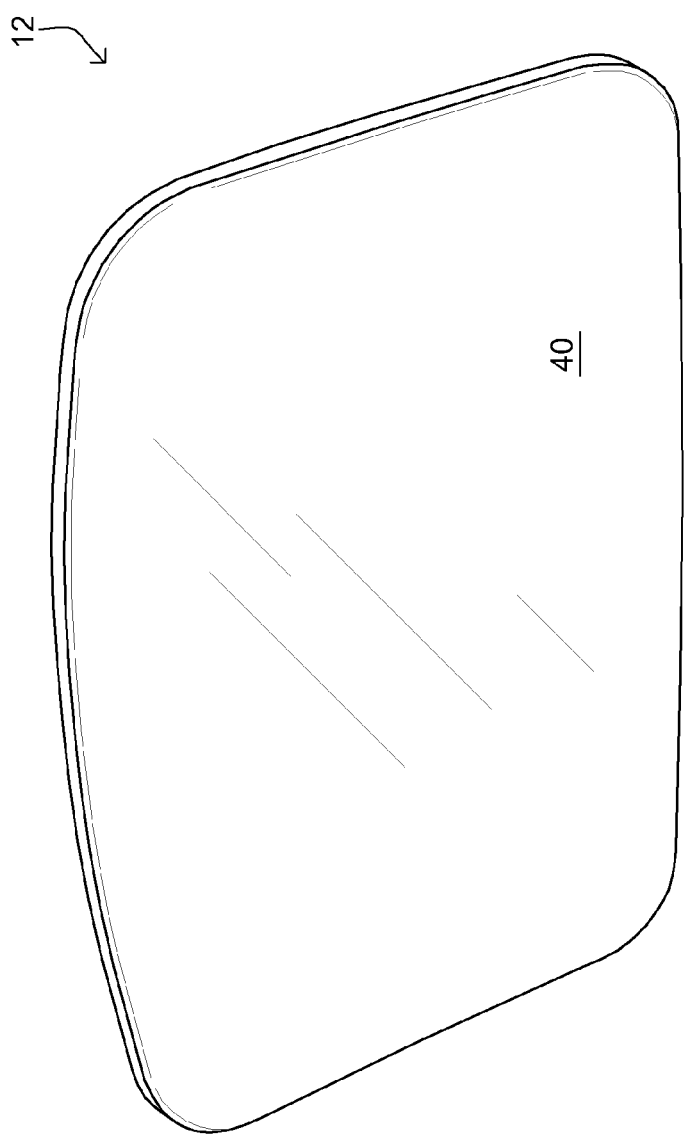
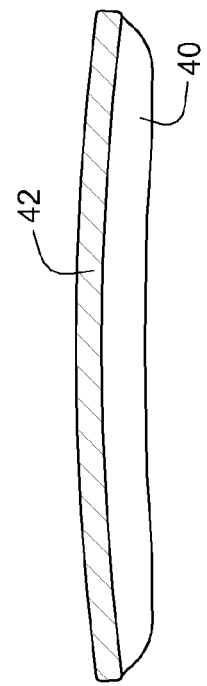
FIG. 7
FIG. 8

BLIND SPOT MIRROR

CROSS-REFERENCE TO RELATED APPLICATIONS

This invention claims priority, under 35 U.S.C. §120, to the U.S. Provisional Patent Application No. 61/365,039 to Harry Snegg filed on Jul. 16, 2010, which is incorporated by reference herein.

BACKGROUND OF THE INVENTION

1. Field of the Invention

The present invention relates to mirrors, specifically to a blind spot mirror configured to couple to a side mounted automobile mirror.

2. Description of the Related Art

Viewing a blind spot in a vehicle is a standard motion as one is trying to make a turn or change lanes. Different vehicles have different blind spots, larger vehicles have bigger blind spots, as the vehicle is longer and, therefore has a larger blind spot area. Smaller vehicles have a smaller blind spot, but nonetheless smaller vehicles still have a blind spot area. Mirrors have been incorporated to existing vehicle mirrors to improve viewing the blind spot area, either by coupling an extra mirror to the vehicle mirror or adding additional mirrors to the vehicle itself. Some improvements have been made in the field. Examples of references related to the present invention are described below in their own words, and the supporting teachings of each reference are incorporated by reference herein:

U.S. Pat. No. 3,131,250, issued to Ely, discloses an accessory for attachment to a conventional planar rear view mirror adjustably mounted on a side of a vehicle to afford the driver a rearward view, said accessory including the combination of: a wedge-shaped supporting member having a planar front face and a planar rear face inclined thereto, said rear face being larger than the mirror portion on the said conventional rear view mirror to be covered by said front face, said mirror-supporting surface having a predominant direction of extension, there being a first fixed angle of inclination within the range of ½ degree to 4 degrees measured in a reference plane extending perpendicularly to said predominant direction of extension, there being defined a second fixed angle.

U.S. Pat. No. 4,293,191, issued to Kim, discloses an adjustable convex rearview mirror comprising a mirror housing carrying a convex mirror and a support housing pivotally coupled to the mirror housing and adapted to be rigidly secured to a planar surface, such as the exterior rearview mirror of a motor vehicle. The mirror housing telescopically receives a part of the support housing therein. The support housing has a cantilever arm thereon with a pin at the distal end. This pin is selectively received in a plurality of apertures in the mirror housing to selectively adjust the angular alignment of the mirror relative to the support housing.

U.S. Pat. No. 4,200,359, issued to Lawson, discloses a mirror assembly for a vehicle. A small, flat mirror is mounted through use of a wedge-shaped adhesive block to the inside portion of a conventional side view mirror. The block positions the small mirror at an angle of about 15.degree. to 20.degree. with respect to the plane of the side view mirror to thereby eliminate the "blind spot" to the side and the rear of the vehicle.

U.S. Pat. No. 4,832,476, issued to Gabrielyan, discloses a Blind Spot Rear-View Minor Assembly System whereby the blind spot to either rear side of the driven vehicle can be observed by the operator. Such system comprises a secondary mirror assembly swivally mounted to the primary or interiorly mounted rear-view mirror assembly in the vehicle. The system includes a base member mounted to the back wall of the primary assembly, and on which a pivot mechanism is mounted, a rod-and-ball arrangement pivotally mounted to such mechanism, with the ball being universally swivelably in a socket in the secondary mirror assembly. A retainer is mounted on the base member to retain the rod in its adjustable length-wise position to the primary assembly with such retention also preventing the primary assembly from freely pivoting about the pivot mechanism, the rod becoming automatically free of the retainer in the event the body of operator or passenger strikes the secondary assembly in a jarring collision.

U.S. Pat. No. 4,863,254, issued to Dyer, discloses: an auxiliary mirror having a base with perpendicular members for abutment with a vehicle mirror housing. An extension on one of the members carries the auxiliary mirror. Elastic straps with hook elements secure the base to the mirror housing. The base is shaped to abut the mirror housing perimeter.

The inventions heretofore known suffer from a number of disadvantages which include being limited in adjustability, being limited in angle-ability, being expensive, being non-durable, being limited in positioning, being bulky, and being limited in positioning, being limited in movement, and being ineffective.

What is needed is a blind spot mirror that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available mirrors. Accordingly, the present invention has been developed to provide a more adjustable and effective blind spot mirror.

According to one embodiment of the invention, there is a blind spot mirror that may be configured to attach to a face of a side mounted automobile mirror. The blind spot mirror may be configured to provide an enhanced view. The blind spot mirror may include a mirror that may include a reflective layer that may be disposed across an interior surface of the mirror. The mirror may include an exterior surface that may not include a reflective layer.

The blind spot mirror may include a mirror housing that may include a cavity that may be sized to receive the mirror. The mirror housing may include a plurality of rectangular-column support posts that may extend upwardly from a bottom surface of the cavity and may be disposed along a perimeter of the cavity, wherein at least two support post may be coupled to each side of the perimeter of the cavity.

The mirror housing may include a plurality of protrusions that may extend inwardly from an interior wall of the cavity and may be spaced above a top surface of a support post, wherein each side of the perimeter of the cavity may include at least one protrusion. The plurality of protrusions may be wedge-shaped, and may have an angled top surface and a flattened bottom surface such that the top surface angles downward and inward, thereby permitting leverage when assembling the mirror. The plurality of protrusions may include a beveled edge and a non-beveled edge that may be configured to prevent the mirror from detaching from the mirror housing; wherein the support posts may be angled to not match a concavity of the rear surface of the mirror such may that a contact point between each support post and the mirror may be a single line of contact along an exterior edge of the mirror instead of an area of contact about the rear surface of the mirror. The mirror may be configured to be inset into the mirror housing in between the plurality of protrusions and the plurality of support posts. The plurality of support posts may be disposed substantially below the plurality of protrusions and may be configured to secure the mirror therebetween.

The blind spot mirror may include a base that may be coupled to a rear surface of the mirror housing. The base may include a flat rear surface that may be configured to couple to a face of a side mounted automobile mirror. The flat rear surface of the base may include a high bond adhesive layer that may be configured to securely couple the blind spot mirror to the side mounted automobile mirror.

The blind spot mirror may include a ball and socket coupling member that may be coupled to the base and the mirror housing. The ball and socket coupling member may be configured to functionally pivot the mirror housing about the side mounted automobile mirror. The ball and socket coupling member may be disposed substantially off-center on the mirror housing.

The blind spot mirror may include an adhesive platform that may be disposed on the socket coupling member, that may be disposed in the cavity of the mirror housing. The adhesive platform may be configured to support an adhesive and may be coupled to the mirror, and secure thereto.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which:

FIG. 7 is a bottom perspective view of a mirror of a blind spot mirror, according to one embodiment of the invention;

FIG. 8 is an exaggerated side cross-sectional view of a mirror of a blind spot mirror, according to one embodiment of the invention;

DETAILED DESCRIPTION OF THE INVENTION

Figure 1:
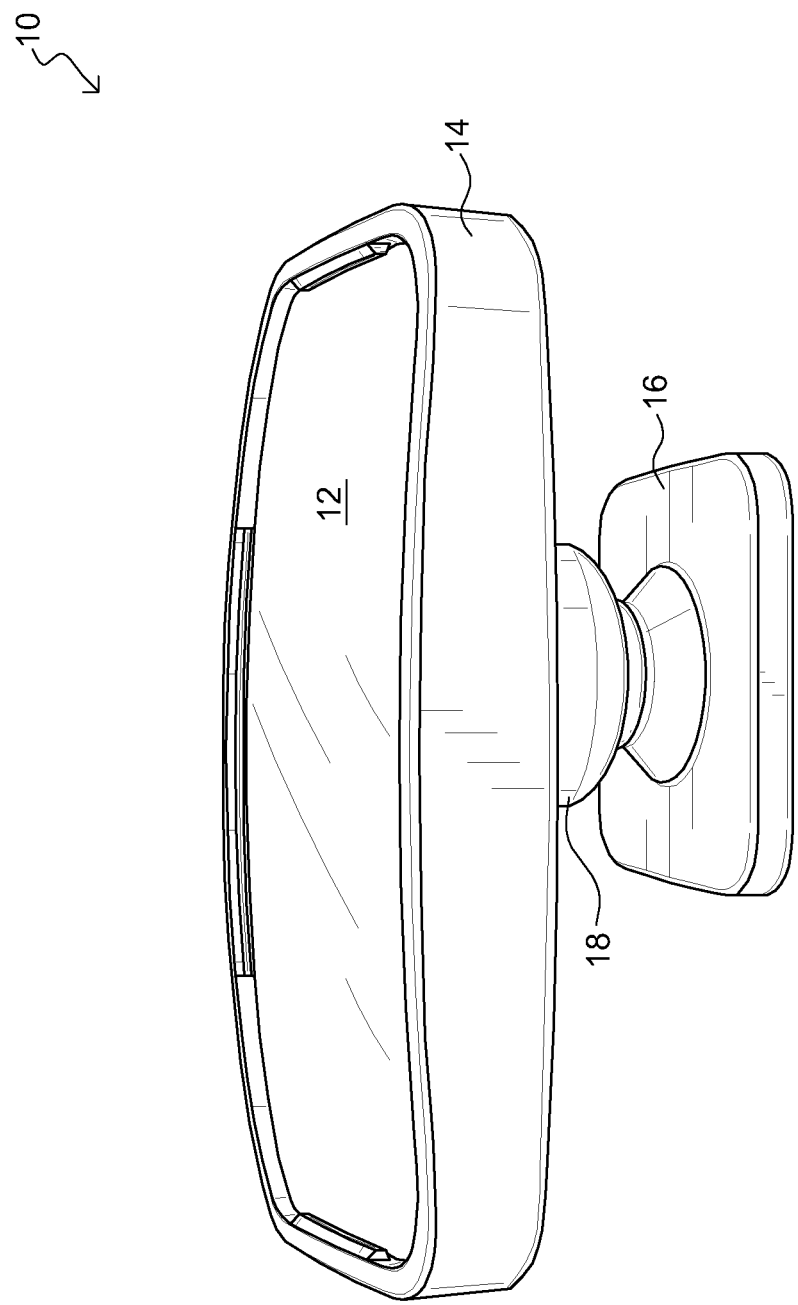
FIG. 1 is a top perspective view of a blind spot mirror, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 is a top perspective view of a blind spot mirror, according to one embodiment of the invention. There is shown a blind spot mirror 10 having a mirror 12, a mirror housing 14, a ball and socket coupling member 18, and a base 16.

The illustrated blind spot mirror 10 is configured to attach to a face of a side mounted automobile mirror, such as a side view mirror of an automobile or motorcycle. The blind spot mirror 10 is configured to provide an enhanced view to a user positioned within the automobile/motorcycle, specifically when in a driver's seat or position. The blind spot mirror 10 includes a mirror 12 inset into a mirror housing 14. The blind spot mirror 10 includes a base 16 coupled to a rear surface of the mirror housing 14. The blind spot mirror 10 includes a ball and socket coupling member 18 coupled to the base 16 and the mirror housing 14. The ball and socket coupling member 18 is configured to functionally pivot the mirror housing 14 about the side mounted automobile mirror. The mirror housing 14 is disposed substantially above the ball and socket coupling member 18, and the ball and socket coupling member 18 is disposed substantially above the base 16.

Figure 2:
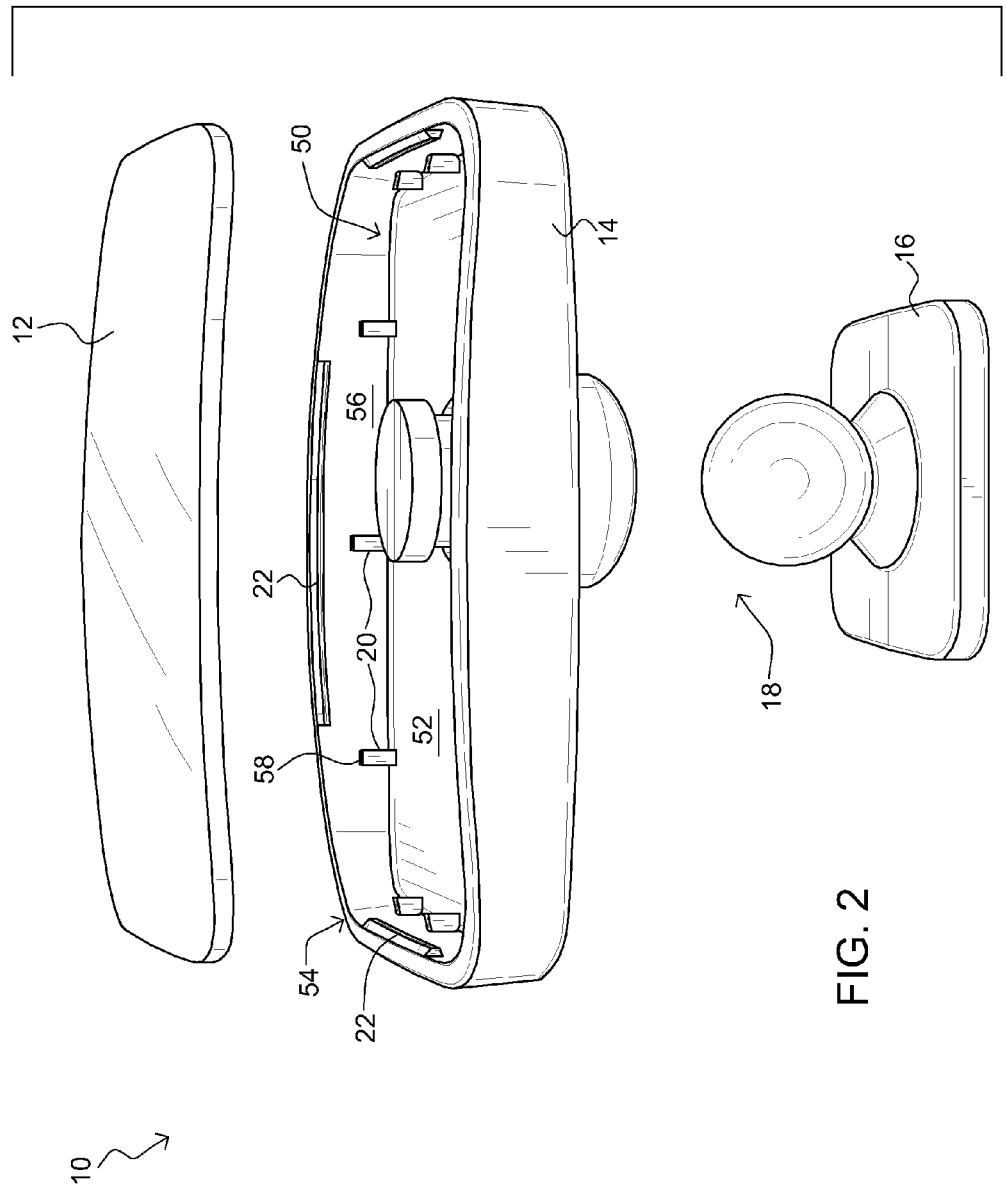
FIG. 2 is an exploded view of a blind spot mirror, according to one embodiment of the invention.

FIG. 2 is an exploded view of a blind spot mirror, according to one embodiment of the invention. There is shown a blind spot mirror 10 having a mirror 12, a mirror housing 14, a ball and socket coupling member 18, and a base 16.

The illustrated blind spot mirror 10 includes a mirror 12. The blind spot mirror 10 includes a mirror housing 14 having a cavity 50 sized and shaped to receive the mirror 12. The mirror housing 14 includes a plurality of rectangular-column support posts 20 extending upwardly from a bottom surface 52 of the cavity 50. The plurality of rectangular-column support posts 20 are disposed along a perimeter 54 of the cavity 50. The plurality of rectangular-column support posts 20 are configured to support a bottom perimeter surface of the mirror 12. The plurality of rectangular-column support posts 20 are positioned within the cavity 50, wherein at least two of the rectangular-column support posts are coupled to each side of the perimeter of the cavity 50 of the mirror housing 14.

The mirror housing 14 includes a plurality of protrusions 22 extending inwardly from an interior wall 56 of the cavity 50. The plurality of protrusions are positioned within the cavity 50, wherein each side of the perimeter of the cavity 50 includes at least one protrusion. The plurality of protrusions 22 are spaced above a top surface 58 of a support post 20. The plurality of rectangular-column support posts 20 are disposed substantially below the plurality of protrusions 22 and are configured to secure the mirror 12 therebetween. The plurality of protrusions 22 are configured to support a top perimeter surface of the mirror 12, opposite of the plurality of rectangular-column support posts 20. The illustrated plurality of protrusions 22 are configured to run along the top perimeter surface of the mirror 12, thereby securing the mirror 12 into the mirror housing 14.

The blind spot mirror 10 includes a base 16 coupled to a rear surface of the mirror housing 14 by a ball and socket coupling member 18. The ball and socket coupling member 18 is configured to functionally pivot the mirror housing 14 about a side mounted automobile or motorcycle mirror.

Figure 3:
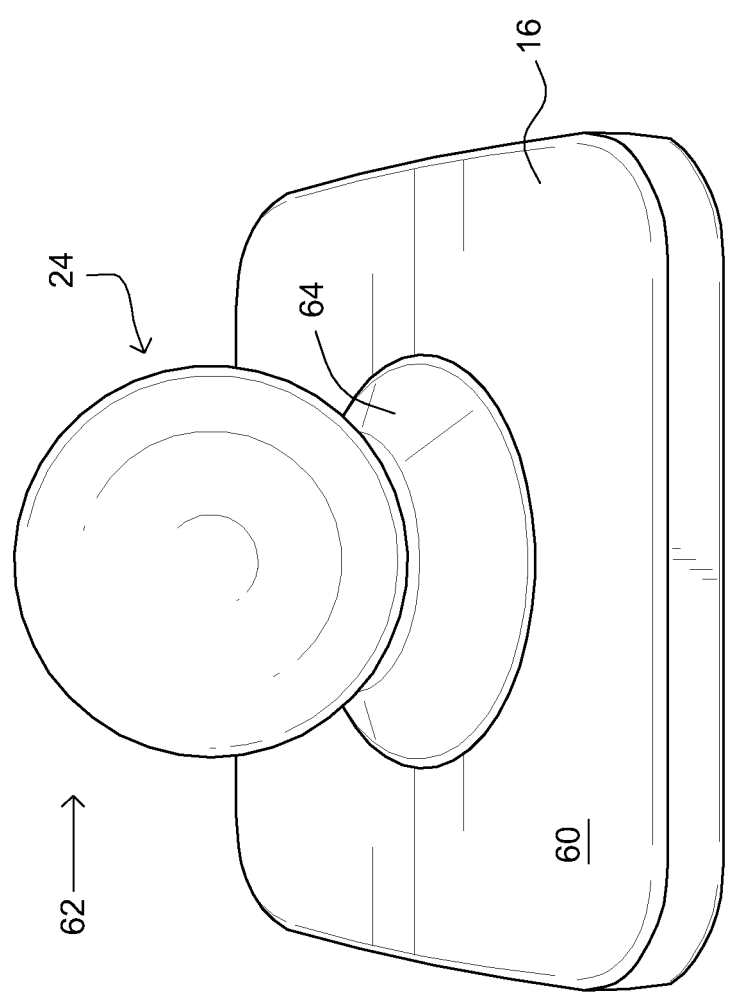
FIG. 3 is a top perspective view of a base and a ball coupling member of a blind spot mirror, according to one embodiment of the invention.
Figure 4:
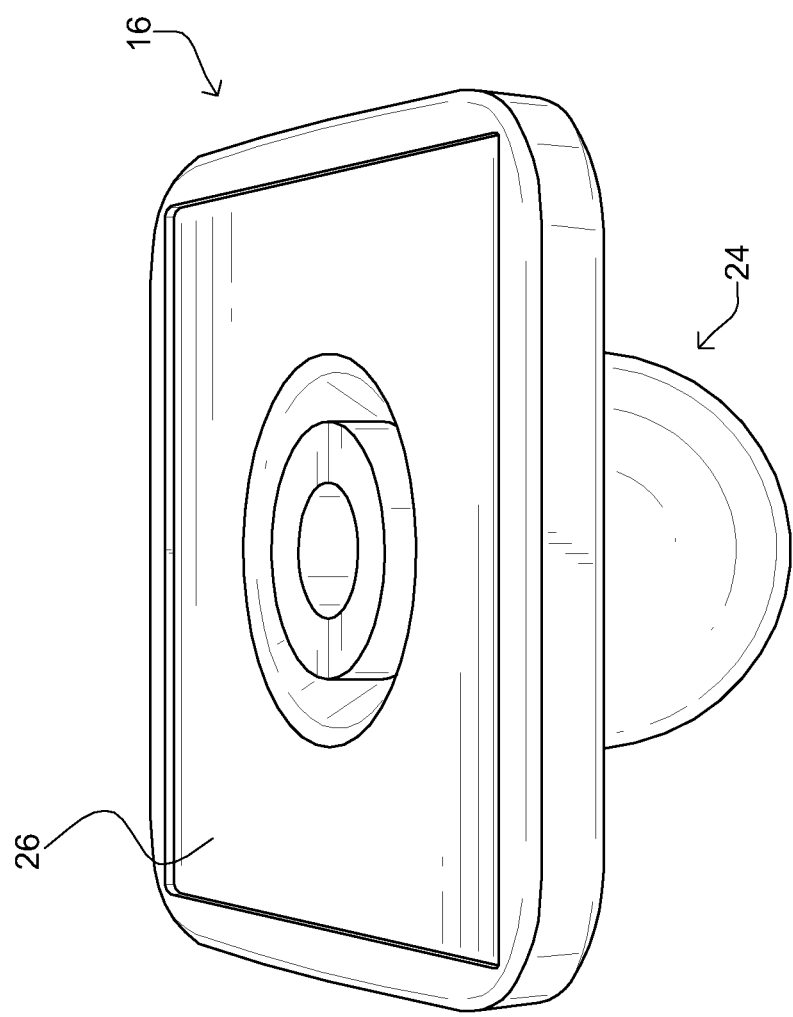
FIG. 4 is bottom perspective view of a base and a ball coupling member of a blind spot mirror, according to one embodiment of the invention.

FIG. 3 is a top perspective view of a base and a ball coupling member of a blind spot mirror, according to one embodiment of the invention; and FIG. 4 is a bottom perspective view of a base and a ball coupling member of a blind spot mirror, according to one embodiment of the invention. There is shown a base 16 and a ball coupling member 24 of a blind spot mirror.

The illustrated base 16 of a blind spot mirror is configured to attach to a face of a side mounted automobile mirror. The base 16 is configured to be coupled to a rear surface of a mirror housing by a ball and socket coupling member. The illustrated base 16 is coupled to a ball coupling member 24 of the ball and socket coupling member. The ball coupling member 24 is disposed substantially in a center of a top surface 60 of the base 16. The ball coupling member 24 includes a coupling end 62 and a base end 64. The coupling end 62 of the ball coupling member 24 is substantially spherical and tapers into the base end 64. The base end 64 is configured to couple to the base 16.

The base 16 includes a flat rear surface 26 configured to couple to a face of a side mounted automobile mirror. The flat rear surface 26 of the base 16 may include a high bond adhesive layer that may be configured to securely couple the blind spot mirror to the side mounted automobile mirror.

Figure 5:
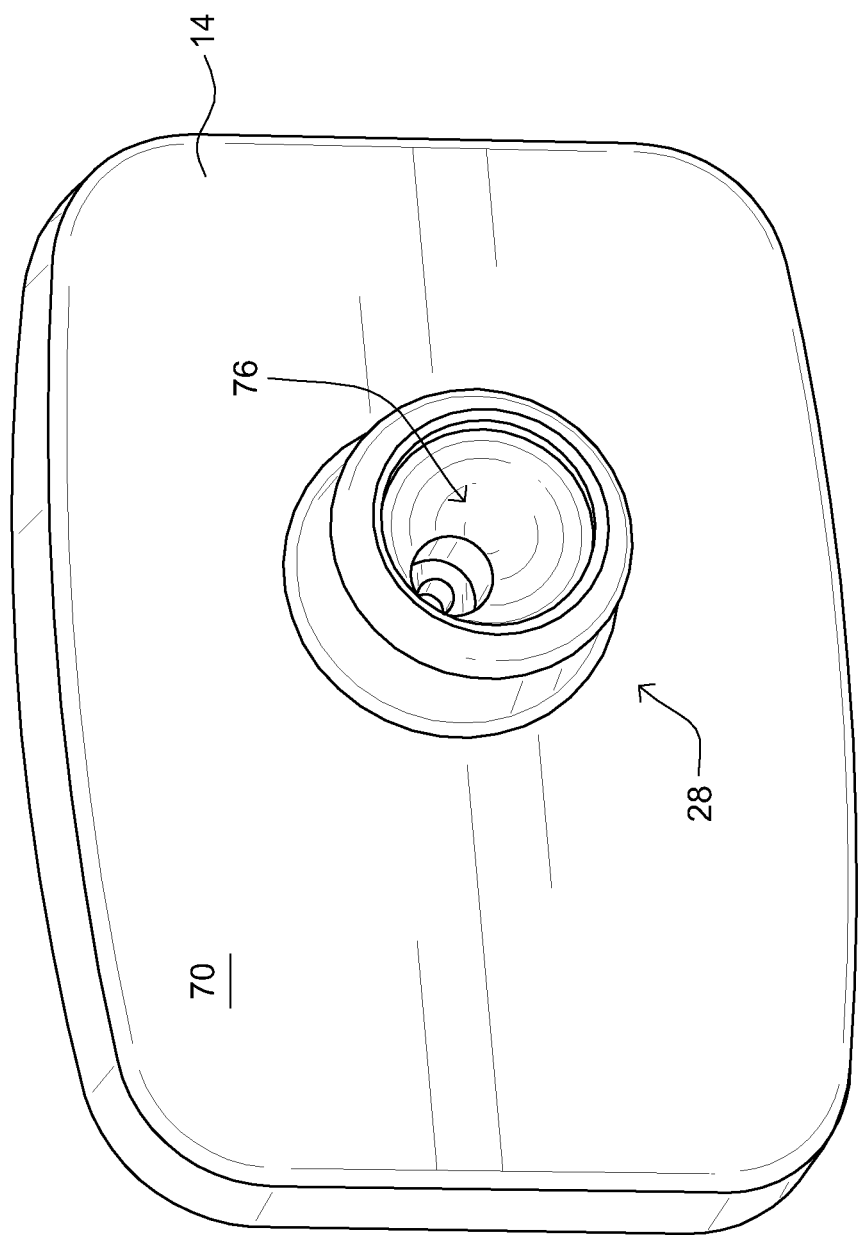
FIG. 5 is a bottom perspective view of a mirror housing and a socket coupling member of a blind spot mirror, according to one embodiment of the invention.
Figure 6:
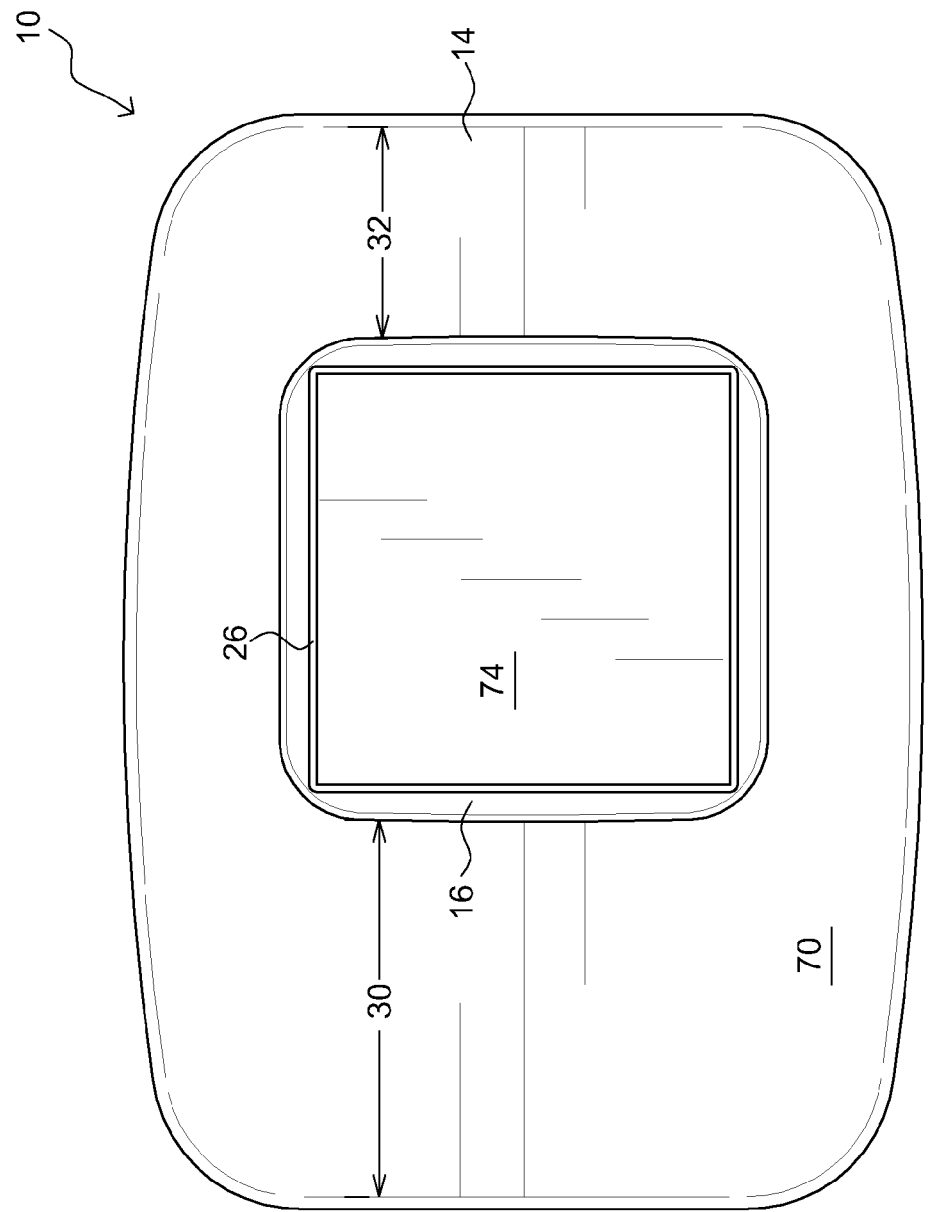
FIG. 6 is a bottom plan view of a blind spot mirror, according to one embodiment of the invention.

FIG. 5 is a bottom perspective view of a mirror housing and a socket coupling member of a blind spot mirror, according to one embodiment of the invention; and FIG. 6 is a bottom plan view of a blind spot mirror, according to one embodiment of the invention. There is shown a mirror housing 14 and a socket coupling member 28 of a blind spot mirror 10.

The illustrated mirror housing 14 is coupled to a socket coupling member 28 of a ball and socket coupling member. The socket coupling member 28 is configured to receive a ball coupling member, coupled to a base 16, and functionally pivot the mirror housing 14 to a plurality of angles. The socket coupling member 28 is disposed substantially off-center on a rear surface 70 of the mirror housing 14. The illustrated socket coupling member 28 includes a receiving end 76 having a concave interior surface configured to receive a ball coupling member.

The blind spot mirror 10 includes a base 16 coupled to a rear surface 70 of the mirror housing 14. The base 16 include a flat rear surface 26 configured to couple to a face of a side mounted automobile mirror. The flat rear surface 26 includes a high bond adhesive layer 74 configured to securely couple the blind spot mirror 10 to a side mounted automobile mirror. The following are examples of high-bond adhesives: 3M VHB Tape, manufactured by 3M, 3M Center, St. Paul, Minn., 55144; CS Hyde UHMW-PE with High Adhesive Liner, manufactured by CS Hyde Co., 1351 North Milwaukee Avenue, Lake Villa, Ill., 60046.

The illustrated base 16 is disposed substantially off-center on a rear surface 70 of the mirror housing 14. The base 16 is disposed substantially off-center from a left end to a right end, wherein a distance from a left end 30 is greater than a distance from a right end 32, thereby positioning the base and a ball and socket coupling member and the base 16 substantially off-center.

FIG. 7 is a bottom perspective view of a mirror of a blind spot mirror, according to one embodiment of the invention. There is shown a mirror 12 of a blind spot mirror.

The illustrated mirror 12 is configured to provide an enhanced view to a driver. The mirror 12 includes a reflective layer 40. The reflective layer 40 is disposed across an interior surface of the mirror 12. The mirror 12 includes an exterior surface including a non-reflective layer. The non-reflective layer is configured to shield the reflective layer 40 from damage and weather conditions during use.

FIG. 8 is an exaggerated cross-sectional view of a mirror according to one embodiment of the invention. There is shown a mirror having a reflective layer 40 disposed across a back/bottom surface of a transparent layer 42. It is typical for blind-spot mirrors to have an opposite configuration, wherein the reflective layer 40 is disposed across a top surface of an opaque substrate, thereby forming a mirror.

Figure 9:
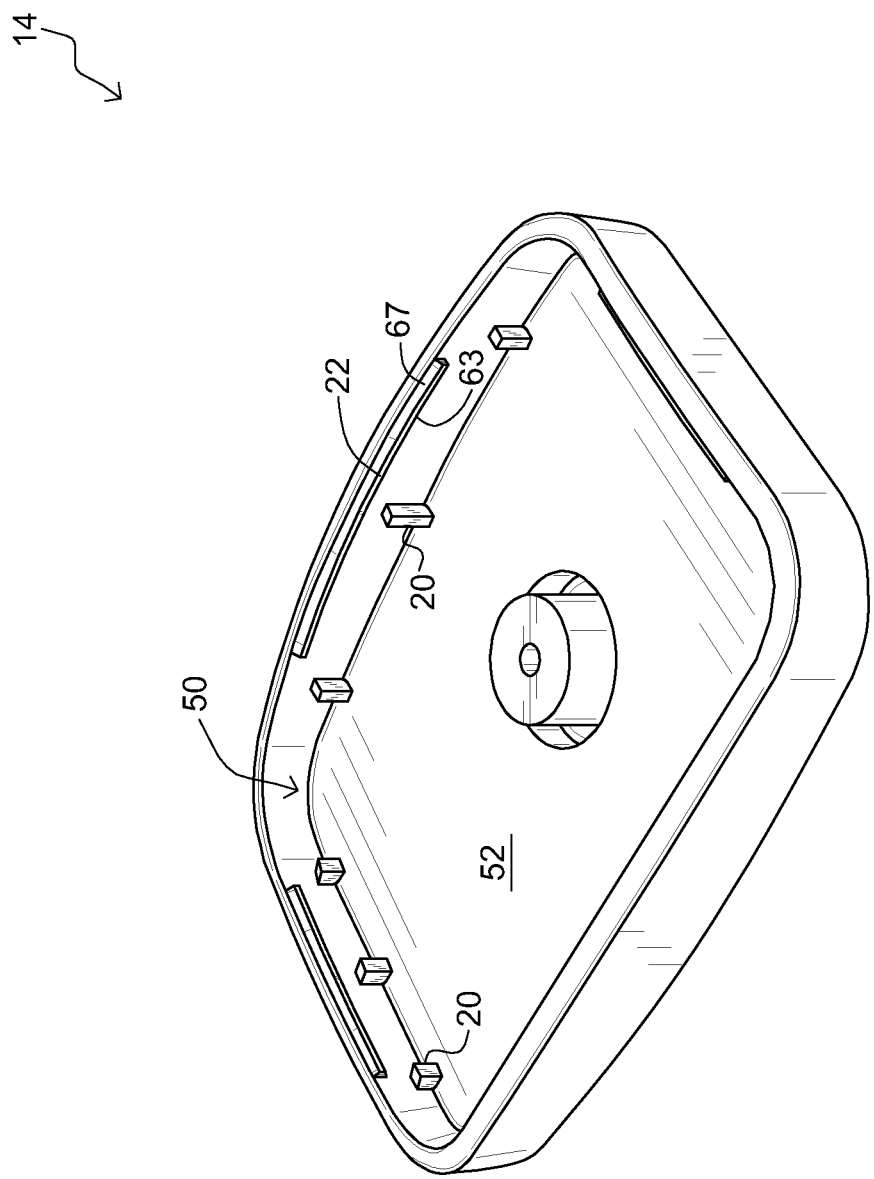
FIG. 9 is a top perspective view of a mirror housing of a blind spot mirror, according to one embodiment of the invention.
Figure 10:
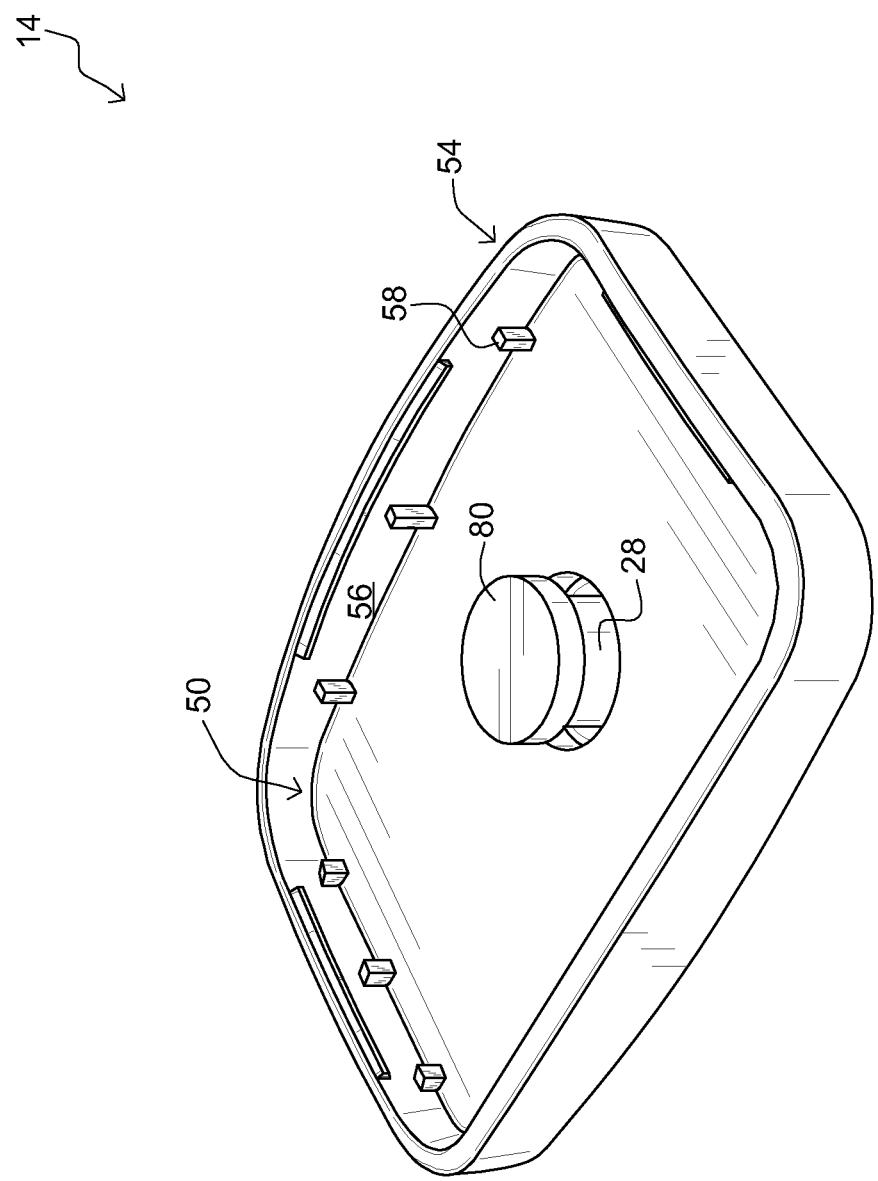
FIG. 10 is a top perspective view of a mirror housing having a adhesive platform of a blind spot mirror, according to one embodiment of the invention.

FIG. 9 is a top perspective view of a mirror housing of a blind spot mirror, according to one embodiment of the invention; and FIG. 10 is a top perspective view of a mirror housing having a adhesive platform of a blind spot mirror, according to one embodiment of the invention. There is shown a mirror housing 14 of a blind spot mirror.

The illustrated mirror housing 14 includes a cavity 50 sized to receive a mirror. The mirror housing 14 includes a plurality of rectangular-column support posts 20 extending upwardly from a bottom surface of the cavity 50. The plurality of rectangular-column support posts 20 are disposed along a perimeter of the cavity 50. The mirror housing 14 includes a plurality of protrusions 22 extending inwardly from an interior wall 56 of the cavity 50. The plurality of protrusions 22 are spaced above a top surface of a rectangular-column support post or a plurality of rectangular-column support posts 20. As illustrated, the rectangular-column support posts disposed closer to the socket coupling member 28, are taller than the rectangular-column support posts further from the socket coupling member 28.

The plurality of protrusions 22 includes a beveled edge 67 configured to facilitate assembly and a non-beveled edge 63 configured to prevent the mirror from detaching from the mirror housing 14. The plurality of rectangular-column support posts 20 are angled to not match a co\cavity of the rear surface of the mirror such that a contact point between each rectangular-column support post and the mirror is a single line or contact along an exterior edge of the mirror instead of an area of contact about the rear surface of the mirror. The plurality of protrusions 22 are wedge-shaped, having an angled top surface 67 and a flattened bottom surface 63 such that the top surface 67 angles downward and inward, thereby permitting leverage when assembling the mirror. The plurality of protrusions 22 are configured to run along the perimeter edge of the mirror and prevent the mirror from detaching from the mirror housing 14. The mirror is configured to be inset into the mirror housing 14 in between the plurality of protrusions 22 and the plurality of rectangular-column support posts 20. The plurality of rectangular-column support posts 20 are disposed substantially below the plurality of protrusions 22 and configured to secure the mirror therebetween.

The illustrated mirror housing 14 includes an adhesive platform 80 disposed above a socket coupling member 28 of a ball and socket coupling member. The adhesive platform 80 is disposed within the cavity 50 of the mirror housing 14. The adhesive platform 80 is configured to support an adhesive layer configured to couple to a rear surface/layer of the mirror, and secure thereto.

In operation of one embodiment of the invention, a user couples the adhesive layer of the base of a blind spot mirror onto a corner of a face of a side mounted automobile mirror. The mirror housing is configured to extend over the edge of the side mounted automobile mirror to provide an enhanced and extended view of a blind spot of an automobile. The blind spot mirror includes a mirror surface area larger than the flat surface of the base, thereby leaving most of the original side mounted automobile mirror still viewable to the driver. The user adjusts the mirror housing by pivoting the ball and socket coupling member to view a blind spot of an automobile.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the Figures illustrate a mirror, a mirror housing, and a base, one skilled in the art would appreciate that the mirror, the mirror housing, and the base may vary in size, shape, design, configuration, color, length, height, width, and still perform its intended function.

Additionally, although the figures illustrate particular shapes and relationsal sizes, it is understood that a plethoric of such shapes and sizes still come within the scope of the claims.

It is envisioned that one skilled in the art would appreciate that the mirror may vary in strength, concavity, angle, tint, surface area, and still perform its intended function.

It is expected that there could be numerous variations of the design of this invention. An example is that the mirror and/or housing may be shaped in a circular, square, rectangular, oval, polygonal, and/or irregularly shaped, and/or combinations thereof.

Finally, it is envisioned that the components of the device may be constructed of a variety of materials, such as, but not limited to plastic, plastic composite, metal, metal alloys, glass, reflective material, rubber, rubber composites, textiles, etc. and still perform its intended function.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A blind spot mirror configured to attach to a face of a side mounted automobile mirror, thereby providing an enhanced view, comprising:
   a) a mirror including a reflective layer disposed across an interior surface of the mirror; wherein an exterior surface of the mirror does not include a reflective layer;
   b) a mirror housing, comprising:
      b1) a cavity sized to receive the mirror wherein the cavity is formed by a perimeter wall extending upwardly from a bottom surface thereby forming a bowl-shaped structure;
      b2) a plurality of rectangular-column support posts coupled to and extending upwardly from a bottom surface of the cavity and coupled directly to and disposed along the perimeter wall of the cavity, wherein at least two support posts are coupled to each side of the perimeter wall of the cavity; and
      b3) a plurality of protrusions, each extending inwardly from the perimeter wall of the cavity and each spaced above a top surface of a support post, wherein each side of the perimeter wall of the cavity includes at least one protrusion; wherein the plurality of protrusions extends over the plurality of rectangular-column support posts; and c) a base coupled to a rear surface of the mirror housing including a flat rear surface configured to couple to a face of a side mounted automobile mirror.

2. The mirror of claim 1, further comprising a ball and socket coupling member coupled to the base and the mirror housing and configured to functionally pivot the mirror housing about the side mounted automobile mirror.

3. The mirror of claim 2, wherein the ball and socket coupling member is disposed substantially off-center, from a left side to a right side, on the mirror housing and wherein the protrusions are wedge-shaped, having an angled top surface and a flattened bottom surface such that the top surface angles downward and inward, thereby permitting leverage when assembling the mirror.

4. The mirror of claim 2, wherein the rectangular-column support posts closer to the ball and socket member are taller than the support posts further from the ball and socket member.

5. The mirror of claim 1, wherein the flat rear surface of the base further includes a high bond adhesive layer configured to securely couple the blind spot mirror to the side mounted automobile mirror.

6. The mirror of claim 2, further comprising an adhesive platform disposed on the socket coupling member, disposed in the cavity of the mirror housing and configured to support an adhesive to couple to the mirror, and secure thereto.

7. The mirror of claim 1, wherein the plurality of protrusions include a beveled edge configured to facilitate assembly and a non-beveled edge configured to prevent the mirror from detaching from the mirror housing, and wherein the rectangular-column support posts are angled to not match a concavity of the rear surface of the mirror such that a contact point between each support post and the mirror is a single line of contact along an exterior edge of the mirror instead of an area of contact about the rear surface of the mirror.

8. The mirror of claim 1, wherein the plurality of rectangular-column support posts are disposed substantially below the plurality of protrusions configured to secure the mirror therebetween.

9. A blind spot mirror configured to attach to a face of a side mounted automobile mirror, thereby providing an enhanced view, consisting essentially of:
 a) a mirror including a reflective layer disposed across an interior surface of the mirror; wherein an exterior surface of the mirror does not include a reflective layer;
 b) a mirror housing, comprising:
  b1) a cavity sized to receive the mirror;
  b2) a plurality of rectangular-column support posts extending upwardly from a bottom surface of the cavity and disposed along a perimeter wall of the cavity; wherein the perimeter wall extends from a bottom surface and the perimeter wall and bottom surface form the cavity; and
  b3) a plurality of protrusions extending inwardly from the perimeter wall of the cavity and spaced above a top surface of a support post; wherein the plurality of protrusions extends over the plurality of rectangular-column support posts;
 c) a base coupled to a rear surface of the mirror housing including a flat rear surface configured to couple to a face of a side mounted automobile mirror; and
 d) a ball and socket coupling member coupled to the base and the mirror housing and configured to functionally pivot the mirror housing about the side mounted automobile mirror.

10. The mirror of claim 9, wherein the ball and socket coupling member is disposed substantially off-center on the mirror housing.

11. The mirror of claim 10, wherein the flat rear surface of the base further includes a high bond adhesive layer configured to securely couple the blind spot mirror to the side mounted automobile mirror.

12. The mirror of claim 11, further comprising an adhesive platform disposed on the socket coupling member disposed in the cavity of the mirror housing and configured to support an adhesive to couple to the mirror, and secure thereto.

13. The mirror of claim 12, wherein the plurality of protrusions include a beveled edge configured to prevent the mirror from detaching from the mirror housing.

14. The mirror of claim 13, wherein the mirror is configured to be inset into the mirror housing in between the plurality of protrusions and the plurality of support posts.

15. The mirror of claim 14, wherein the plurality of rectangular-column support posts are disposed substantially below the plurality of protrusions configured to secure the mirror therebetween.

16. A blind spot mirror configured to attach to a face of a side mounted automobile mirror, thereby providing an enhanced view, consisting of:
 a) a mirror including a reflective layer disposed across an interior surface of the mirror; wherein an exterior surface of the mirror does not include a reflective layer;
 b) a mirror housing, comprising:
  b1) a cavity sized to receive the mirror;
  b2) a plurality of rectangular-column support posts extending upwardly from a bottom surface of the cavity and disposed along a perimeter of the cavity; wherein the cavity is formed by a perimeter wall extending upwardly from a bottom surface; and
  b3) a plurality of protrusions extending inwardly from the perimeter wall of the cavity and spaced above a top surface of a support post; wherein the plurality of protrusions include a beveled edge configured to prevent the mirror from detaching from the mirror housing; wherein the mirror is configured to be inset into the mirror housing in between the plurality of protrusions and the plurality of rectangular-column support posts; wherein the plurality of rectangular-column support posts are disposed substantially below the plurality of protrusions configured to secure the mirror therebetween; wherein the plurality of protrusions extends over the plurality of rectangular-column support posts;
 c) a base coupled to a rear surface of the mirror housing including a flat rear surface configured to couple to a face of a side mounted automobile mirror; wherein the flat rear surface of the base further includes a high bond adhesive layer configured to securely couple the blind spot mirror to the side mounted automobile mirror;
 d) a ball and socket coupling member coupled to the base and the mirror housing and configured to functionally pivot the mirror housing about the side mounted automobile mirror; wherein the ball and socket coupling member is disposed substantially off-center on the mirror housing; and
 e) an adhesive platform disposed on the socket coupling member disposed in the cavity of the mirror housing and configured to support an adhesive to couple to the mirror, and secure thereto.

* * * * *